(12) United States Patent
Nakahira et al.

(10) Patent No.: US 7,215,623 B2
(45) Date of Patent: May 8, 2007

(54) REPRODUCTION SIGNAL PROCESSING APPARATUS

(75) Inventors: Hiroyuki Nakahira, Kyoto (JP); Takashi Morie, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 548 days.

(21) Appl. No.: 10/704,691

(22) Filed: Nov. 12, 2003

(65) Prior Publication Data

US 2004/0165510 A1    Aug. 26, 2004

(30) Foreign Application Priority Data

Feb. 26, 2003    (JP)    ............... 2003-048495

(51) Int. Cl.
G11B 7/05    (2006.01)
(52) U.S. Cl. ............... 369/59.21; 369/59.22; 369/59.16
(58) Field of Classification Search ............ 369/59.21, 369/59.16
See application file for complete search history.

(56) References Cited

U.S. PATENT DOCUMENTS

| 5,604,724 | A | * | 2/1997 | Shiokawa | ............ | 369/59.22 |
| 5,659,527 | A | * | 8/1997 | Sasaki | ............ | 369/44.34 |
| 5,675,569 | A | * | 10/1997 | Yamaguchi et al. | ..... | 369/59.16 |
| 5,694,424 | A | * | 12/1997 | Ariyavisitakul | ............ | 375/233 |
| 5,909,661 | A | * | 6/1999 | Abramovitch et al. | ...... | 702/191 |
| 6,377,529 | B1 | * | 4/2002 | Lee et al. | ............ | 369/59.1 |
| 6,577,568 | B1 | * | 6/2003 | Konishi et al. | ........... | 369/44.32 |
| 6,724,706 | B1 | * | 4/2004 | Nakajima et al. | ........ | 369/59.23 |

FOREIGN PATENT DOCUMENTS

| JP | 5-135313 | A | 6/1993 |
| JP | 7-282405 | A | 10/1995 |
| JP | 9-98069 | A | 4/1997 |
| JP | 09-106547 | | 4/1997 |
| JP | 10-177768 | A | 6/1998 |
| JP | 10-255214 | A | 9/1998 |
| JP | 2000-182330 | A | 6/2000 |
| JP | 2000-276848 | A | 10/2000 |

OTHER PUBLICATIONS

Japanese Office Action issued in corresponding Japanese Patent Application No. JP 2003-359045, dated Nov. 7, 2006.

* cited by examiner

Primary Examiner—Andrea Wellington
Assistant Examiner—Jorge L. Ortiz-Criado
(74) Attorney, Agent, or Firm—McDermott Will & Emery LLP

(57) ABSTRACT

An analog filter is placed at a stage previous to an analog-digital converter (ADC), and a waveform equalizer is placed at a stage subsequent to the ADC. The sampling frequency of the ADC is determined by a clock generation section according to the relationship between the bit rate of an input reproduction signal and the characteristic of the analog filter. The number of taps is changed according to the relationship between the bit rate of the input reproduction signal and the characteristic of the analog filter. Further, the tap coefficients of a waveform equalizer are changed according to the height of the frequency band of the input reproduction signal. A waveform evaluation section generates a signal that evaluates a waveform equalization signal transmitted from the waveform equalizer to a Viterbi decoder, whereby adaptive waveform equalization is realized.

8 Claims, 14 Drawing Sheets

REPRODUCTION SIGNAL PROCESSING APPARATUS

BACKGROUND OF THE INVENTION

The present invention relates to a reproduction signal processing apparatus which equalizes the waveform of an input reproduction signal that is reproduced from a recording medium and outputs a binary signal based on the equalized waveform.

Conventionally, a waveform equalization technique for equalizing the waveform of a signal reproduced from a recording medium, such as a magnetic tape, a magnetic disk, an optical disk, etc., has been known (see Japanese Unexamined Patent Publications Nos. 5-135313, 10-255214, and 2000-182330).

In a reproduction signal processing apparatus for an optical disk, such as a CD (compact disk), a DVD (digital versatile disk), etc., the characteristics of an input reproduction signal differ according to the type of a recording medium, a recording method, a reproduction speed, etc. Thus, the reproduction signal processing apparatus must have a plurality of waveform equalization characteristics and adapt itself to a wide frequency band.

However, the conventional reproduction signal processing apparatus does not consider such variations in the characteristics of the input reproduction signal in a waveform equalization process.

SUMMARY OF THE INVENTION

An objective of the present invention is to provide a reproduction signal processing apparatus with which a waveform equalization characteristic optimum for the characteristics of an input reproduction signal is achieved.

In order to achieve this objective, a reproduction signal processing apparatus of the present invention employs the following arrangements in consideration of a large difference in the bit rate of an input reproduction signal between the single-speed reproduction mode and the double-speed reproduction mode. An analog filter is placed at a stage previous to an analog-digital converter, and a waveform equalizer is placed at a stage subsequent to the analog-digital converter. The sampling frequency of the analog-digital converter is determined according to the relationship between the bit rate of the input reproduction signal and the characteristic of the analog filter. The number of taps is changed according to the relationship between the bit rate of the input reproduction signal and the characteristic of the analog filter.

Furthermore, tap coefficients of a waveform equalizer are changed according to the height of the frequency band of the input reproduction signal in consideration of a difference in the frequency band of the input reproduction signal between a control signal and a data signal reproduced from, for example, a DVD.

DESCRIPTION OF THE PREFERRED EMBODIMENTS

Hereinafter, an embodiment of the present invention is described with reference to the drawings. It should be noted that the embodiment described below is merely an example of the present invention, but the present invention is not limited thereto.

Figure 1:
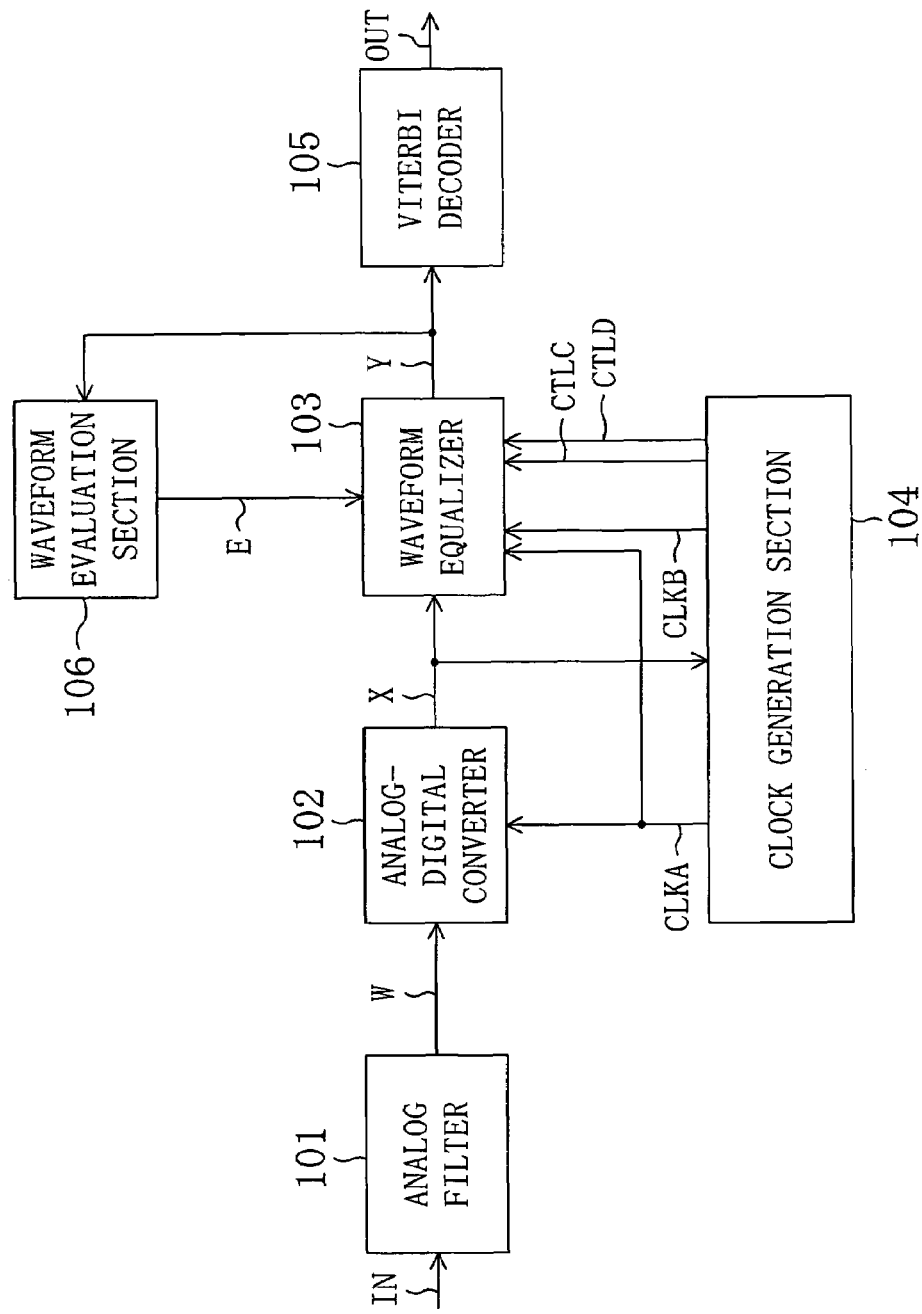
FIG. 1 is a block diagram showing an exemplary structure of a reproduction signal processing apparatus according to the present invention.

FIG. 1 shows an example of the structure of a reproduction signal processing apparatus according to the present invention. In FIG. 1, reference numeral 101 denotes an analog filter, reference numeral 102 denotes an analog-digital converter (ADC), reference numeral 103 denotes a waveform equalizer, reference numeral 104 denotes a clock generation section, reference numeral 105 denotes a Viterbi decoder, and reference numeral 106 denotes a waveform evaluation section.

The analog filter 101 receives an input reproduction signal IN reproduced from an optical disk, such as a CD, a DVD, or the like, and has a low pass filter characteristic. The ADC 102 converts an analog reproduction signal W output from the analog filter 101 to a digital reproduction signal X. The main function of the clock generation section 104 is to extract a clock signal from the digital reproduction signal X and generate first and second clock signals CLKA and CLKB which are in synchronization with the extracted clock signal. The first clock signal CLKA determines the sampling frequency of the ADC 102. The first clock signal CLKA is supplied not only to the ADC 102 but also to the waveform equalizer 103. As described below, the sampling frequency of the ADC 102 is determined according to the relationship between the bit rate of the input reproduction signal IN, which is deduced from the digital reproduction signal X, and the characteristic of the analog filter 101. The second clock signal CLKB determines the internal operation frequency of the waveform equalizer 103. The frequency of the second clock signal CLKB is equal to or several times higher than that of the first clock signal CLKA. The clock generation section 104 also generates first and second control signals CTLC and CTLD which are used for switching the operation of the waveform equalizer 103. The first control signal CTLC is used for instructing to change the number of taps of the waveform equalizer 103. The second control signal CTLD is used for instructing to change the tap coefficients of the waveform equalizer 103 according to the height of the frequency band of the input reproduction signal IN which is deduced from the digital reproduction signal X. The waveform equalizer 103 equalizes the waveform of the digital reproduction signal X and outputs a result of the equalization as a waveform equalization signal Y to the Viterbi decoder 105. The Viterbi decoder 105 obtains a binary signal from the waveform equalization signal Y by maximum likelihood decoding. The binary signal is an output signal OUT of the reproduction signal processing apparatus of FIG. 1. The waveform evaluation section 106 supplies an evaluation signal E to the waveform equalizer 103 in order to realize adaptive waveform equalization. The evaluation signal E represents the timing jitter value, the degree of asymmetry, etc., of the waveform equalization signal Y.

The waveform equalizer 103 of FIG. 1 functions as an FIR (finite impulse response) filter. In the case where the sampling frequency of the ADC 102 is changed, it is necessary to change the number of taps of the waveform equalizer 103 according to the change of the sampling frequency in order to obtain the same waveform equalization characteristic both before and after the change of the sampling frequency. For example, consider a case where the sampling frequency is doubled. If the number of taps is an odd number, the number of taps is doubled, and 1 is subtracted therefrom. If the number of taps is an even number, the number of taps is simply doubled. Specifically, if the original number of taps is 3, the number of taps is changed to 5 (3×2−1=5). In the description below, the number of taps of the waveform equalizer 103 is 3 or 5. In the case where the number of taps is 3, the frequency of the second clock signal CLKB is equal to that of the first clock signal CLKA. In the case where the number of taps is 5, the frequency of the second clock signal CLKB is twice that of the first clock signal CLKA.

Figure 2:
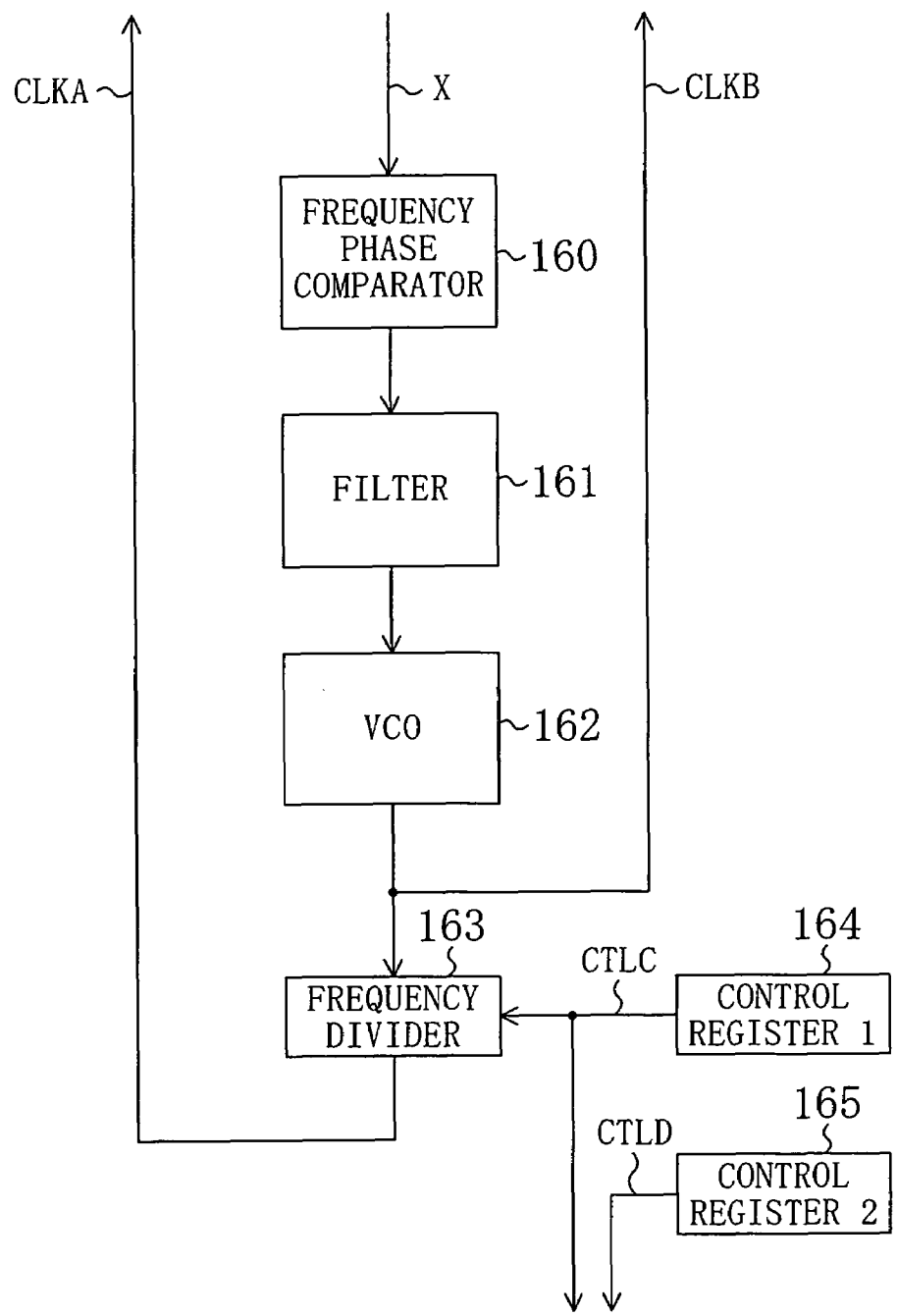
FIG. 2 is a block diagram showing the internal structure of a clock generation section of FIG. 1.

FIG. 2 shows the internal structure of the clock generation section 104 of FIG. 1. In FIG. 2, reference numeral 160 denotes a frequency phase comparator, reference numeral 161 denotes a filter, reference numeral 162 denotes a VCO (voltage-controlled oscillator), reference numeral 163 denotes a frequency divider, and reference numerals 164 and 165 denote control registers. The frequency divider 163 receives the second clock signal CLKB and outputs the first clock signal CLKA. The frequency dividing ratio of the frequency divider 163 is controlled by the first control signal CTLC such that the frequency dividing ratio is changed in accordance with the change of the number of taps of the waveform equalizer 103. The first and second control signals CTLC and CTLD are obtained from the control registers 164 and 165, respectively. A microprocessor (not shown) that administers the entire control of the reproduction signal processing apparatus also executes the setting of the control registers 164 and 165. Although in FIG. 2 the first and second clock signals CLKA and CLKB are extracted from the digital reproduction signal X which is output from the ADC 102, the waveform equalization signal Y which is output from the waveform equalizer 103 may be input to the clock generation section 104 in place of the digital reproduction signal X.

Figure 3:
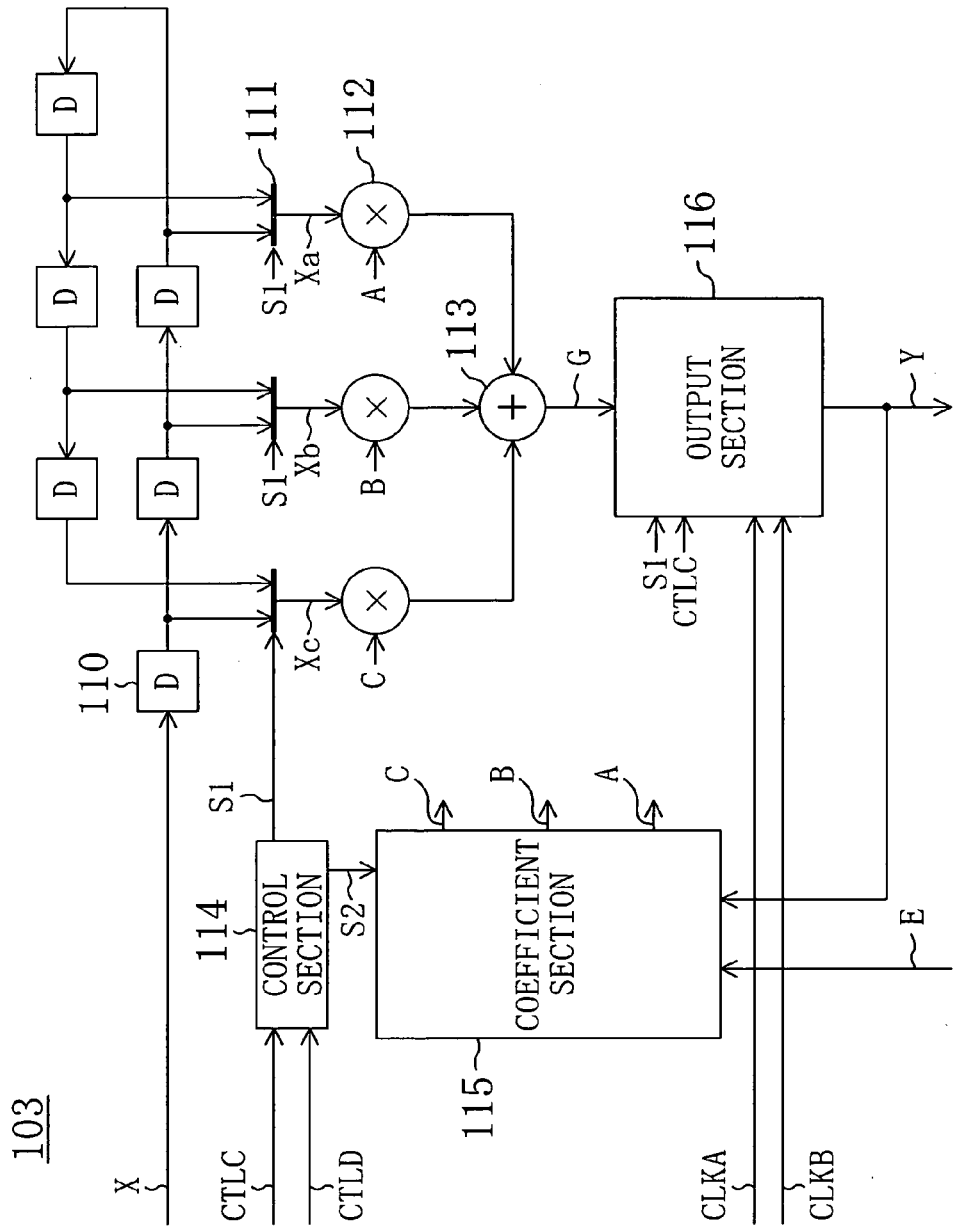
FIG. 3 is a block diagram showing the internal structure of a waveform equalizer of FIG. 1.

FIG. 3 shows the internal structure of the waveform equalizer 103 of FIG. 1. In FIG. 3, reference numeral 110 denotes six D-flip flops connected to form a delay element including a plurality of stages for delaying propagation of the digital reproduction signal X, reference numeral 111 denotes three multiplexers, reference numeral 112 denotes three multipliers, reference numeral 113 denotes an adder, reference numeral 114 denotes a control section, reference numeral 115 denotes a coefficient section, and reference numeral 116 denotes an output section. Although not shown, each D-flip flop 110 propagates the digital reproduction signal X in synchronization with the first clock signal CLKA, and the multipliers 112 and the adder 113 execute arithmetic operations in synchronization with the second clock signal CLKB. The control section 114 controls the number of the D-flip flops 110 to be used, which determines the number of taps of the waveform equalizer 103, and supply of tap coefficients A, B and C from the coefficient section 115 such that the multipliers 112 and the adder 113 are used in a time-division manner when the number of the multipliers 112 is smaller than the number of necessary taps (i.e., when the number of necessary taps is 5). When the number of the D-flip flops 110 used is greater than the number of the multipliers 112 by a factor of 3 or more, the multipliers 112 and the adder 113 are used in a time-division manner by a factor of 3 or more by increasing the frequency of the second clock signal CLKB.

The three multiplexers 111 of FIG. 3 select three out of the six outputs of the D-flip flops 110 as tap data signals Xa, Xb, and Xc. The three multipliers 112 multiply the outputs of the D-flip flops 110 which have been selected by the multiplexers 111, i.e., the tap data signals Xa, Xb, and Xc, by the tap coefficients A, B and C, respectively. The adder 113 calculates the sum of the outputs of the three multipliers 112 and supplies a result G of the addition to the output section 116. The output section 116 receives the addition result G and outputs a result of a clipping (rounding) process as the waveform equalization signal Y. The control section 114 generates first and second selection signals S1 and S2. The first selection signal S1 is supplied to the multiplexers 111 and the output section 116. The second selection signal S2 is supplied to the coefficient section 115. The coefficient section 115 supplies the tap coefficients A, B and C respectively to the three multipliers 112. The coefficient section 115 adaptively updates the tap coefficients A, B and C according to at least one of the waveform equalization signal Y and the evaluation signal E.

Figure 4:
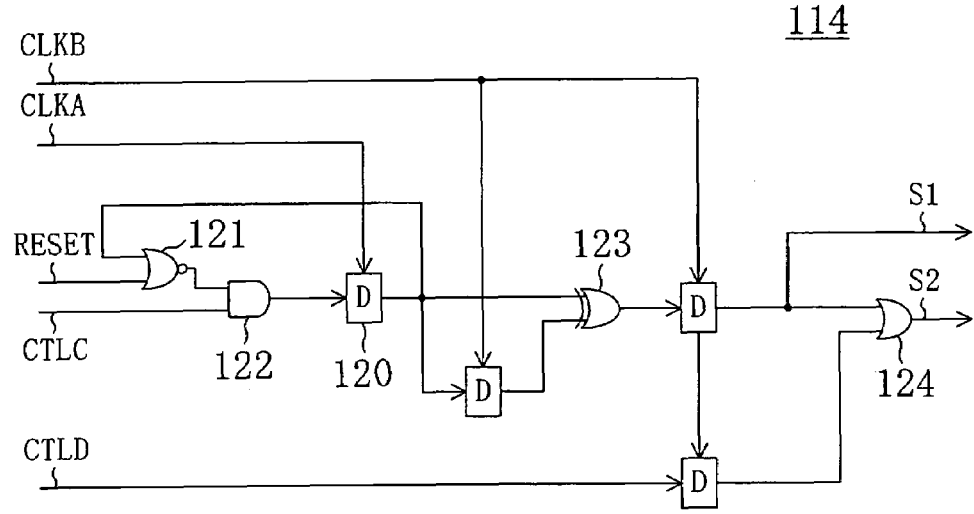
FIG. 4 is a circuit diagram showing the internal structure of a control section of FIG. 3.

FIG. 4 shows the internal structure of the control section 114 of FIG. 3. Referring to FIG. 4, the control section 114 includes four D-flip flops 120, a NOR gate 121, an AND gate 122, an EXOR (exclusive OR) gate 123, and an OR gate 124. The control section 114 receives the first and second clock signals CLKA and CLKB, the first and second control signals CTLC and CTLD, and a reset signal RESET. The control section 114 outputs the first and second selection signals S1 and S2.

Figure 5:
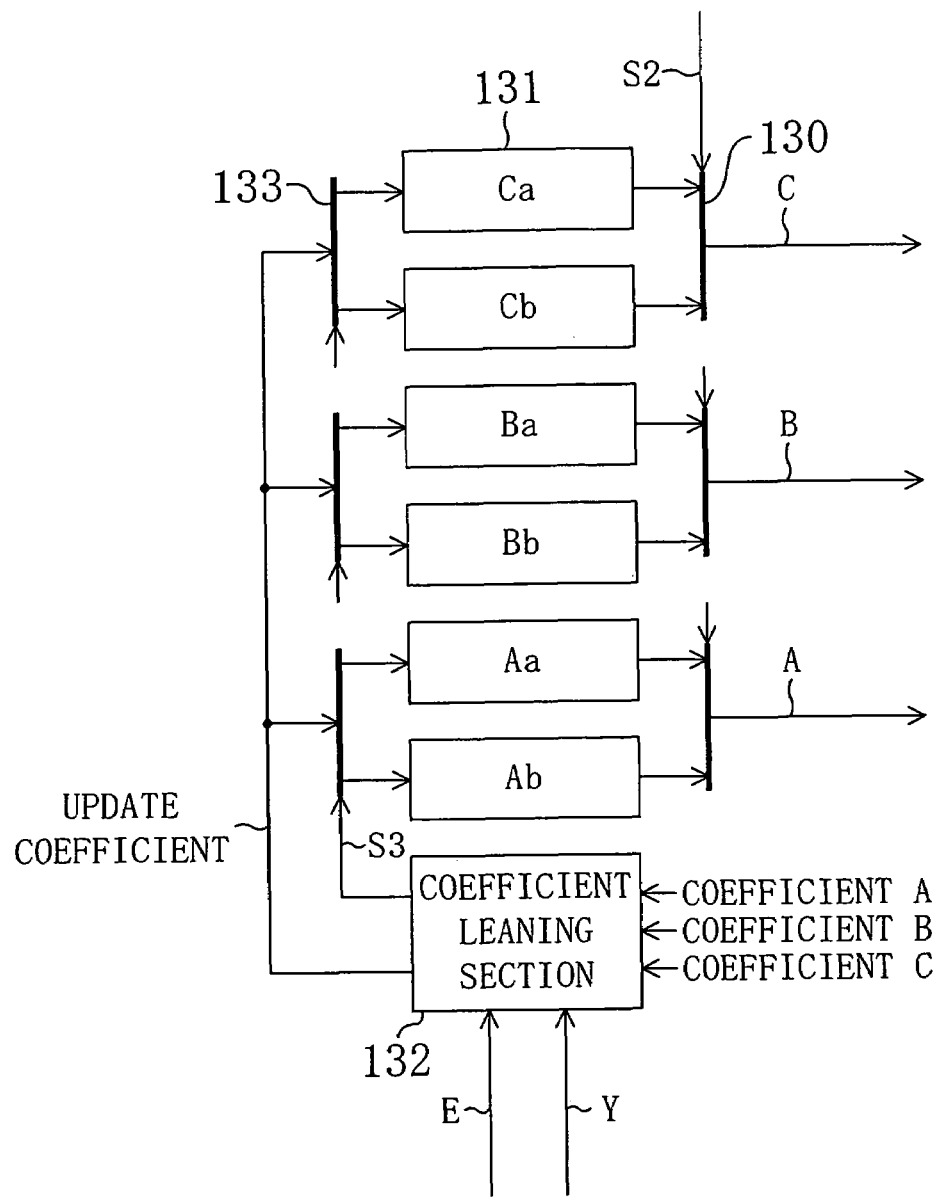
FIG. 5 is a block diagram showing the internal structure of the control section of FIG. 3.

FIG. 5 shows the internal structure of the coefficient section 115 of FIG. 3. Referring to FIG. 5, reference numeral 130 denotes three output-side multiplexers, reference numeral 131 denotes six registers for retaining coefficients Aa, Ab, Ba, Bb, Ca, and Cb, reference numeral 132 denotes a coefficient leaning section, and reference numeral 133 denotes three input-side multiplexers. The output-side multiplexers 130 select the coefficients according to the second selection signal S2. Specifically, when the number of taps is 3, the set of coefficients (Aa, Ba, Ca) are selected. When the number of taps is 5, the set of coefficients (Aa, Ba, Ca) are first selected, and then, the set of coefficients (Cb, Bb) are selected. The coefficient leaning section 132 has a learning function such that the tap coefficients A, B and C are adaptively updated according to the waveform equalization signal Y or the evaluation signal E. The coefficient leaning section 132 supplies update coefficients which are to be written in the registers 131. The coefficient leaning section 132 also supplies a third selection signal S3 to the input-side multiplexers 133 for selection of the update coefficients.

Figure 6:
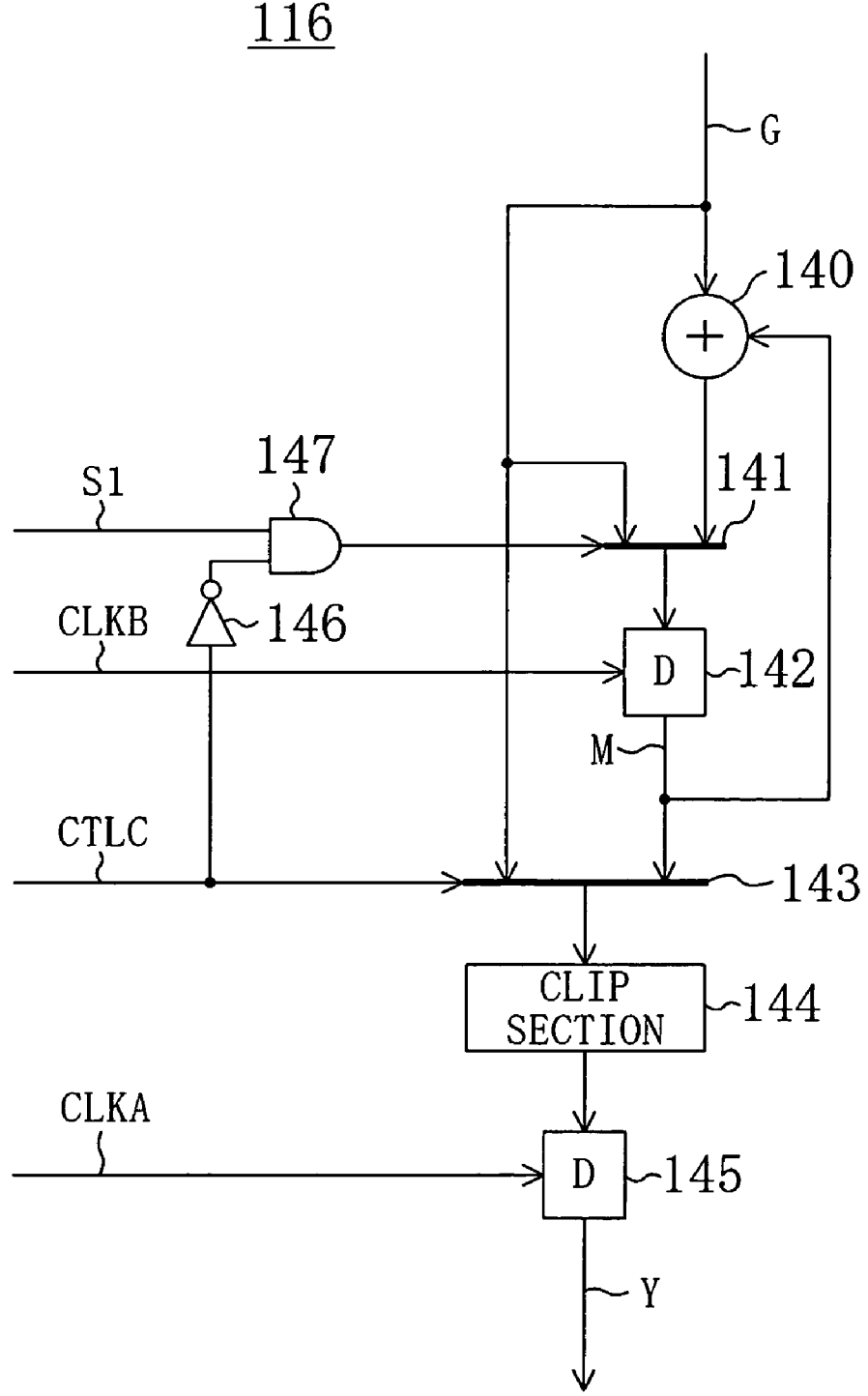
FIG. 6 is a block diagram showing the internal structure of an output section of FIG. 3.

FIG. 6 shows the internal structure of the output section 116 of FIG. 3. Referring to FIG. 6, reference numeral 140 denotes an adder, reference numerals 141 and 143 denote first and second multiplexers, reference numeral 142 and 145 denote first and second D-flip flops, reference numeral 144 denotes a clip section, reference numeral 146 denotes an inverter, reference numeral 147 denotes an AND gate, and reference mark M denotes a sum of products when the number of taps is 5. When the number of taps is 5, the adder 140, the first multiplexer 141 and the first D-flip flop 142 function together as an accumulator for accumulating the addition result G supplied from the adder 113 to obtain the sum of products M. Thus, the first multiplexer 141 receives a logical product signal of the first selection signal S1 and an inverted signal of the first control signal CTLC. The first D-flip flop 142 receives the second clock signal CLKB. When the number of taps is 3, the addition result G supplied from the adder 113 of FIG. 3 is used as it is. Therefore, the second multiplexer 143 selects any of the addition result G and the sum of products M according to the first control signal CTLC. The clip section 144 performs a clipping (rounding) process on the output of the second multiplexer 143. The second D-flip flop 145 receives the output of the clip section 144 in synchronization with the first clock signal CLKA and outputs the received signal as the waveform equalization signal Y.

Figure 7:
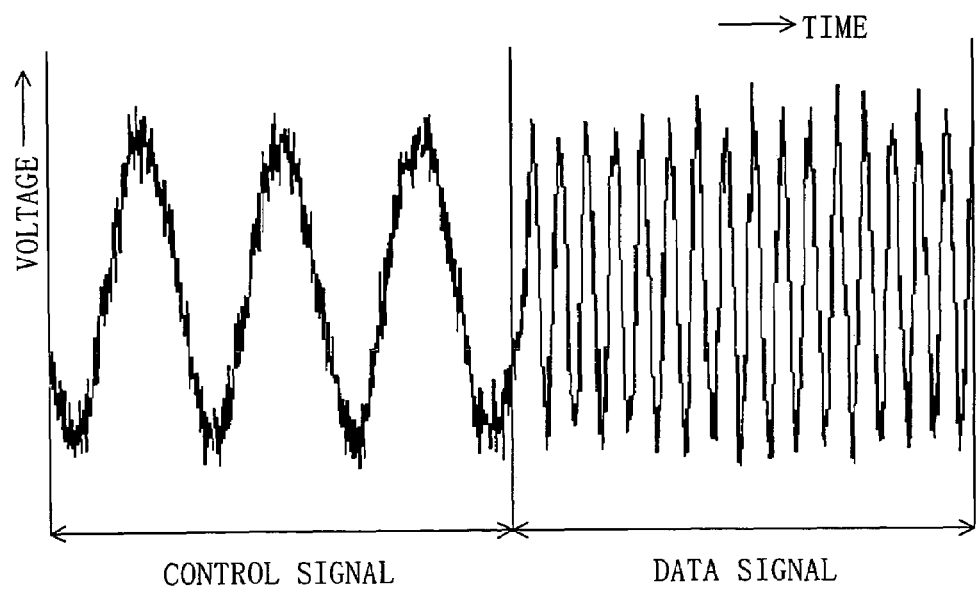
FIG. 7 is a waveform chart which illustrates an example of an input reproduction signal.

FIG. 7 shows an example of an input reproduction signal IN reproduced from a DVD. For example, the first half of the shown signal is used for control and the frequency band thereof is low. The second half of the signal is a data signal portion, and the frequency band thereof is high. In the case where such waveforms having different frequency bands are sequentially input, the tap coefficients A, B and C are switched according to the second control signal CTLD without changing the number of taps of the waveform equalizer 103. That is, in FIG. 3, only the second selection signal S2 is switched, while the first selection signal S1 is kept unchanged.

Figure 8:
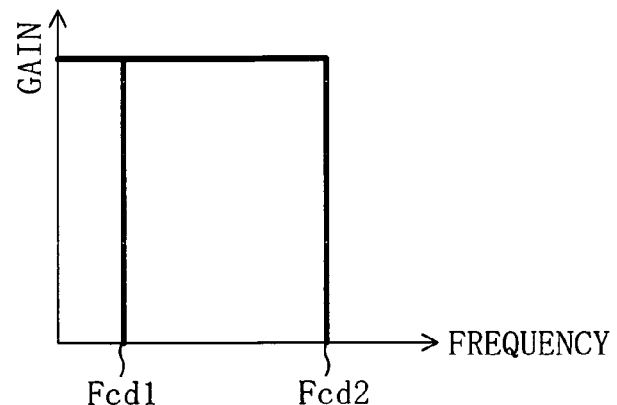
FIG. 8 illustrates waveform equalization characteristics corresponding to a control signal and data signal of FIG. 7.

FIG. 8 shows waveform equalization characteristics corresponding to the control signal and the data signal of FIG. 7. Herein, the waveform is equalized with a low pass filter characteristic in either case for simplicity of description. The cutoff frequency Fcd1 corresponds to the control signal, and the cutoff frequency Fcd2 corresponds to the data signal (Fcd1<Fcd2). The tap coefficients A, B and C are changed by the second control signal CTLD according to the height of the frequency band of the input reproduction signal IN, whereby the cutoff frequency of the waveform equalizer 103 is switched.

Figure 9A:
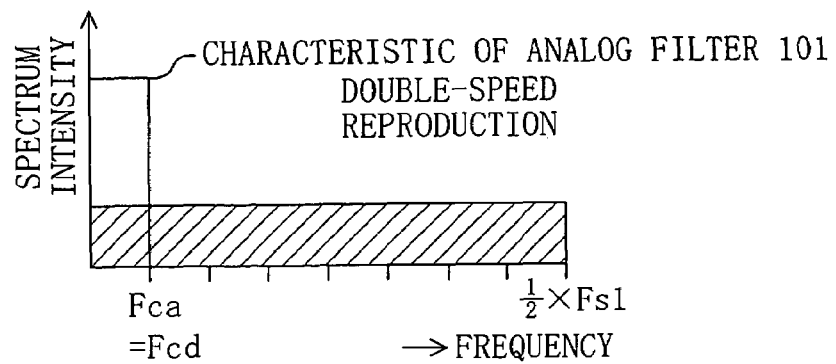
FIGS. 9A, 9B and 9C illustrate how to determine the frequency of a first clock signal of FIG. 1.
Figure 9B:
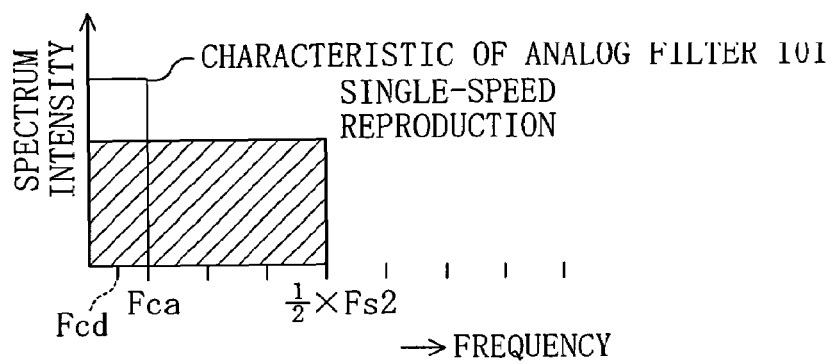
Figure 9C:
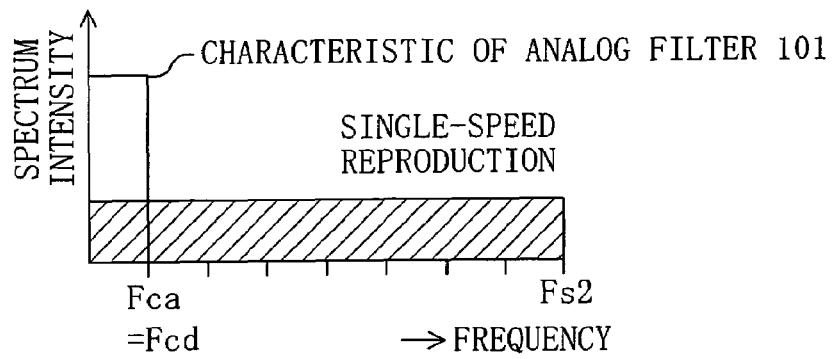

FIGS. 9A, 9B and 9C each show a quantized noise spectrum intensity distribution of the ADC 102 which is superposed on the characteristic of the analog filter 101. These graphs are used to describe how to determine the frequency of the first clock signal CLKA.

FIG. 9A illustrates an example of the double-speed reproduction for CD. Reference mark Fs1 denotes the sampling frequency of the ADC 102. Reference mark Fca denotes the cutoff frequency of the analog filter 101. Reference mark Fcd denotes the cutoff frequency of the waveform equalizer 103. In this example, Fca=Fcd. As shown, the quantized noise of the ADC 102 exists substantially uniformly over the range from the direct current to the Nyquist frequency (a half of the sampling frequency Fs1).

FIG. 9B illustrates an example of the single-speed reproduction for CD. That is, the bit rate of the input reproduction signal IN is half that of the double-speed reproduction. Reference mark Fs2 denotes the sampling frequency of the ADC 102. The sampling frequency Fs2 is a half of the sampling frequency Fs1 of FIG. 9A. The cutoff frequency Fca is kept unchanged, and the cutoff frequency Fcd is a half of the cutoff frequency Fca. Thus, the combined frequency band of the analog filter 101 and the waveform equalizer 103 is half that of the example shown in FIG. 9A. In this case, the quantized bit count of the ADC 102 is constant, the sum of quantized noise power is the same as that of the example shown in FIG. 9A. Thus, as shown in FIG. 9B by hatching, the quantized noise power per unit frequency is twice that of the example shown in FIG. 9A. As a result, the signal-to-noise ratio deteriorates in the band equal to or lower than the cutoff frequency Fca.

FIG. 9C illustrates another example of the single-speed reproduction for CD where the sampling frequency of the ADC 102 is twice that of the example shown in FIG. 9B (i.e., 2Fs2=Fs1). In this case, the quantized noise power per unit frequency is equal to that of the example shown in FIG. 9A. Thus, the signal-to-noise ratio is also equal to that of the example shown in FIG. 9A. That is, in the single-speed reproduction for CD, the signal-to-noise ratio is improved by setting the sampling frequency of the ADC 102 to a frequency equal to that of the double-speed reproduction.

As described above, the sampling frequency of the ADC 102, i.e., the frequency of the first clock signal CLKA, is determined according to the relationship between the bit rate of the input reproduction signal IN and the characteristics (especially, the cutoff frequency) of the analog filter 101. On the other hand, the waveform equalizer 103 is controlled such that the number of taps is doubled as described above in order to obtain the same waveform equalization characteristic even when the frequency of the first clock signal CLKA is doubled. Specifically, the number of taps is set to 3 in the examples of FIGS. 9A and 9B, whereas the number of taps is set to 5 in the example of FIG. 9C.

Thus, according to the present invention, control is performed such that the ratio of a higher one of the cutoff frequency Fca of the analog filter 101 and the cutoff frequency Fcd of the waveform equalizer 103 to the sampling frequency of the ADC 102 is constant, whereby the quantized noise power per unit frequency, which is included in the waveform equalization signal Y output from the waveform equalizer 103, is kept constant.

Figure 10:
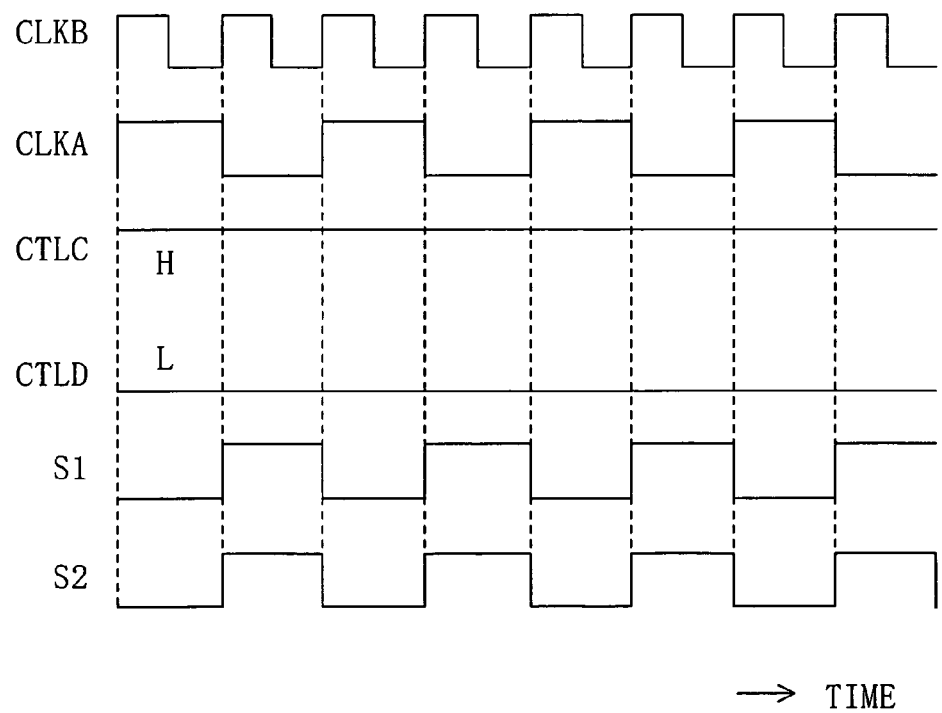
FIG. 10 is a timing chart which illustrates an operation example of a control section of FIG. 4.
Figure 11:
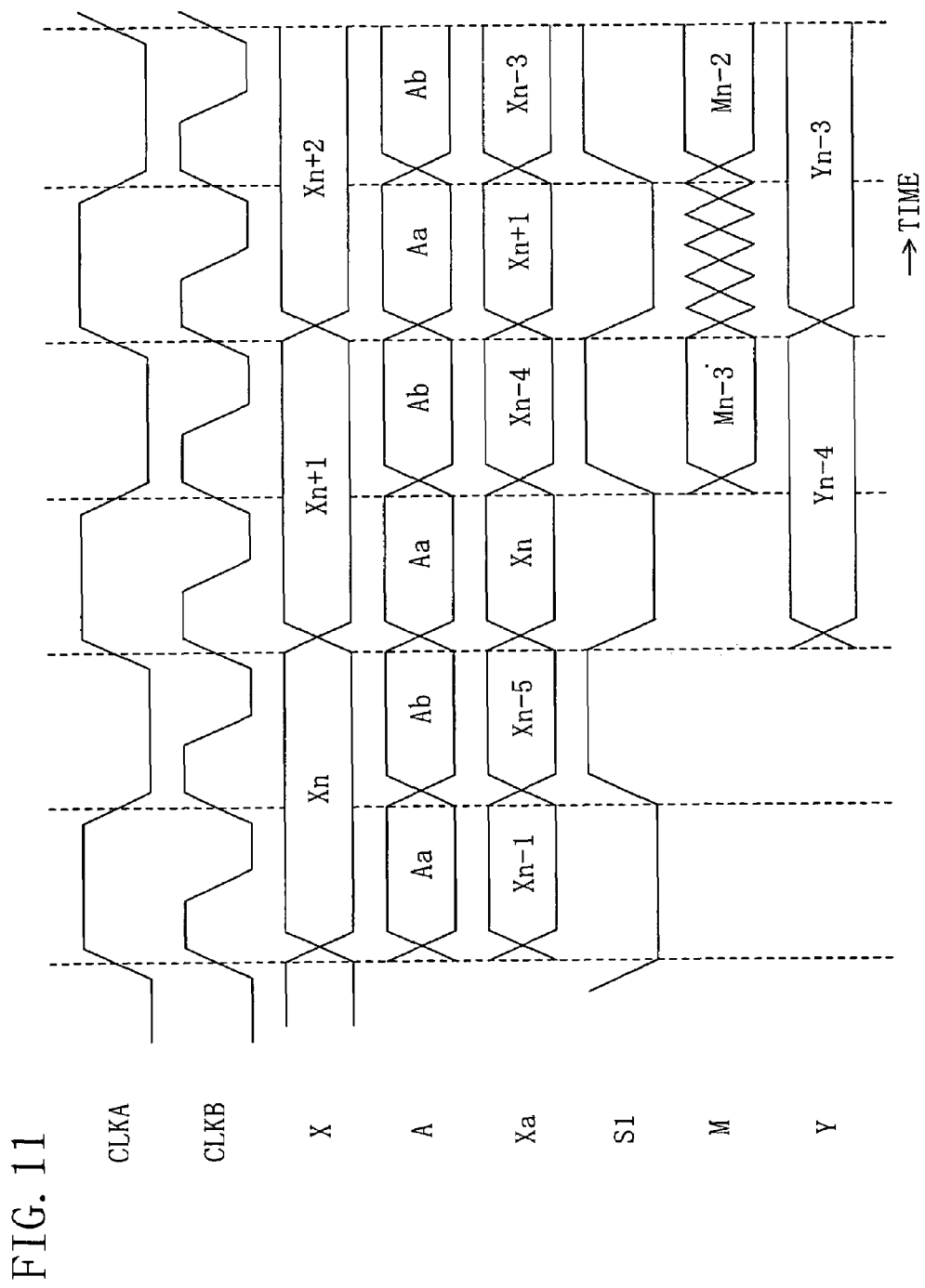
FIG. 11 is a timing chart which illustrates an operation example of a waveform equalizer of FIG. 3.

FIG. 10 illustrates an example of the operation of the control section 114 which is performed when the number of taps is 5. FIG. 11 illustrates an example of the entire operation of the waveform equalizer 103 which is performed when the number of taps is 5. As shown in FIG. 10, by keeping the first control signal CTLC at high (H) level and the second control signal CTLD at low (L) level, the first and second selection signals S1 and S2 are toggled between H level and L level at a frequency equal to that of the first clock signal CLKA after the reset signal RESET of FIG. 4 is supplied. With such an arrangement, the time-divisional operation is achieved in the waveform equalizer 103 of FIG. 3. Although not shown, if both the first and second control signals CTLC and CTLD are kept at L level, the first and second selection signals S1 and S2 are maintained at L level, and the number of taps of the waveform equalizer 103 is 3. If the second control signal CTLD is kept at H level, only the second selection signal S2, which is supplied to the coefficient section 115, can be changed.

Figure 12:
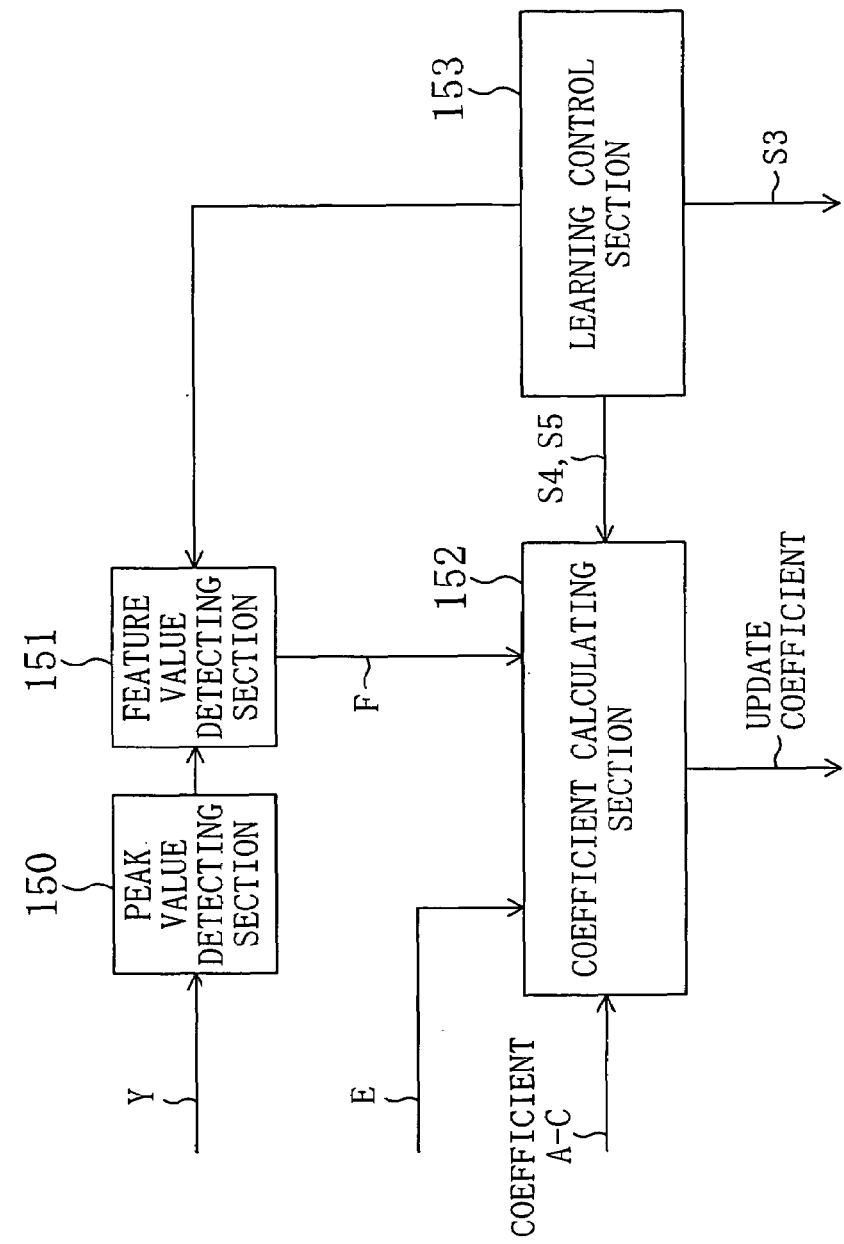
FIG. 12 is a block diagram showing the internal structure of a coefficient learning section of FIG. 5.

FIG. 12 shows the internal structure of the coefficient leaning section 132 of FIG. 5. In an example described herein, an envelope of the waveform equalization signal Y is used. In FIG. 12, reference numeral 150 denotes a peak value detecting section, reference numeral 151 denotes a feature value detecting section, reference numeral 152 denotes a coefficient calculating section, and reference numeral 153 denotes a learning control section. The peak value detecting section 150 detects an upper peak value and lower peak value of the waveform equalization signal Y. The feature value detecting section 151 detects the maximum amplitude value Amax, the minimum amplitude value Amin, or the like, of the waveform equalization signal Y from the detected upper and lower peak values and outputs the result of the detection as a feature signal F. The coefficient calculating section 152 calculates update values for the tap coefficients A, B and C, or selects the tap coefficients A, B and C to be set, based on the evaluation signal E from the waveform evaluation section 106 or the feature signal F from the feature value detecting section 151. The learning control section 153 controls the detection timing of the feature value detecting section 151. The learning control section 153 generates the third selection signal S3. On the other hand, the learning control section 153 generates fourth and fifth selection signal for controlling the operation of the coefficient calculating section 152.

Figure 13:
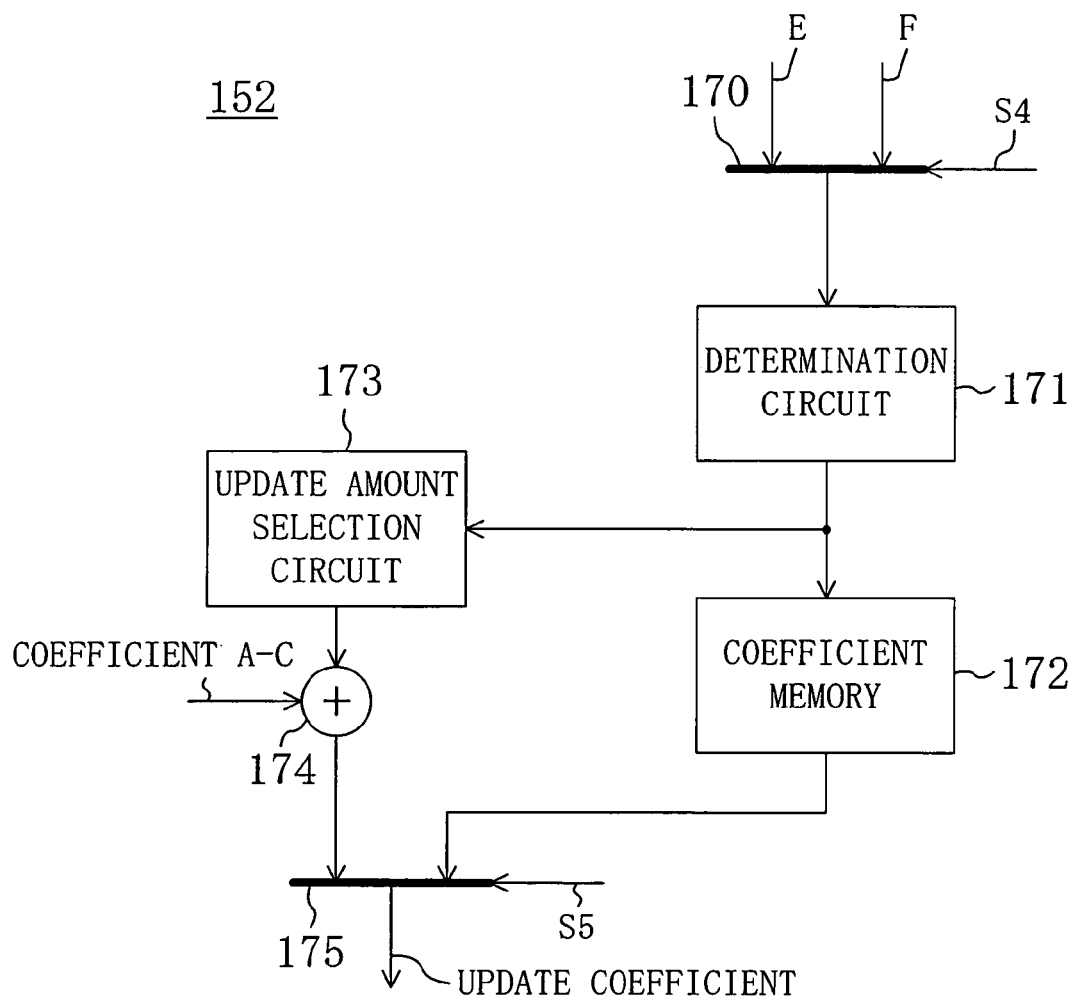
FIG. 13 is a block diagram showing the internal structure of the coefficient calculating section of FIG. 12.

FIG. 13 shows the internal structure of the coefficient calculating section 152 of FIG. 12. In FIG. 13, reference numeral 170 denotes an input multiplexer, reference numeral 171 denotes a determination circuit, reference numeral 172 denotes a coefficient memory, reference numeral 173 denotes an update amount selection circuit, reference numeral 174 denotes an adder, and reference numeral 175 denotes an output multiplexer. The input multiplexer 170 selects any of the evaluation signal E from the waveform evaluation section 106 and the feature signal F from the feature value detecting section 151 according to the fourth selection signal S4. The evaluation signal E represents a result of evaluation of the waveform equalization signal Y which is obtained by performing the evaluation for a relatively long time period. The feature signal F represents a feature of the waveform equalization signal Y which is detected within a relatively short time period. The determination circuit 171 compares the evaluation signal E or the feature signal F with a predetermined value to examine the signal quality, and determines update coefficients according to the examination result. The coefficient memory 172 stores a plurality of sets of tap coefficients in advance and selects one of the sets according to the determination for the evaluation signal E or the feature signal F. The update amount selection circuit 173 selects an update amount for fine adjustment of the tap coefficients A, B and C according to the determination for the evaluation signal E or the feature signal F. The adder 174 adds together the current tap coefficients A, B and C and the update amount. The output multiplexer 175 selects any of the output of the coefficient memory 172 and the output of the adder 174 as the update coefficients according to the fifth selection signal. In the case where the tap coefficients A, B and C are changed in a stepwise fashion, the output of the coefficient memory 172 is selected. In the case where the tap coefficients A, B and C are changed in a gradual fashion, the output of the adder 174 is selected.

Figure 14:
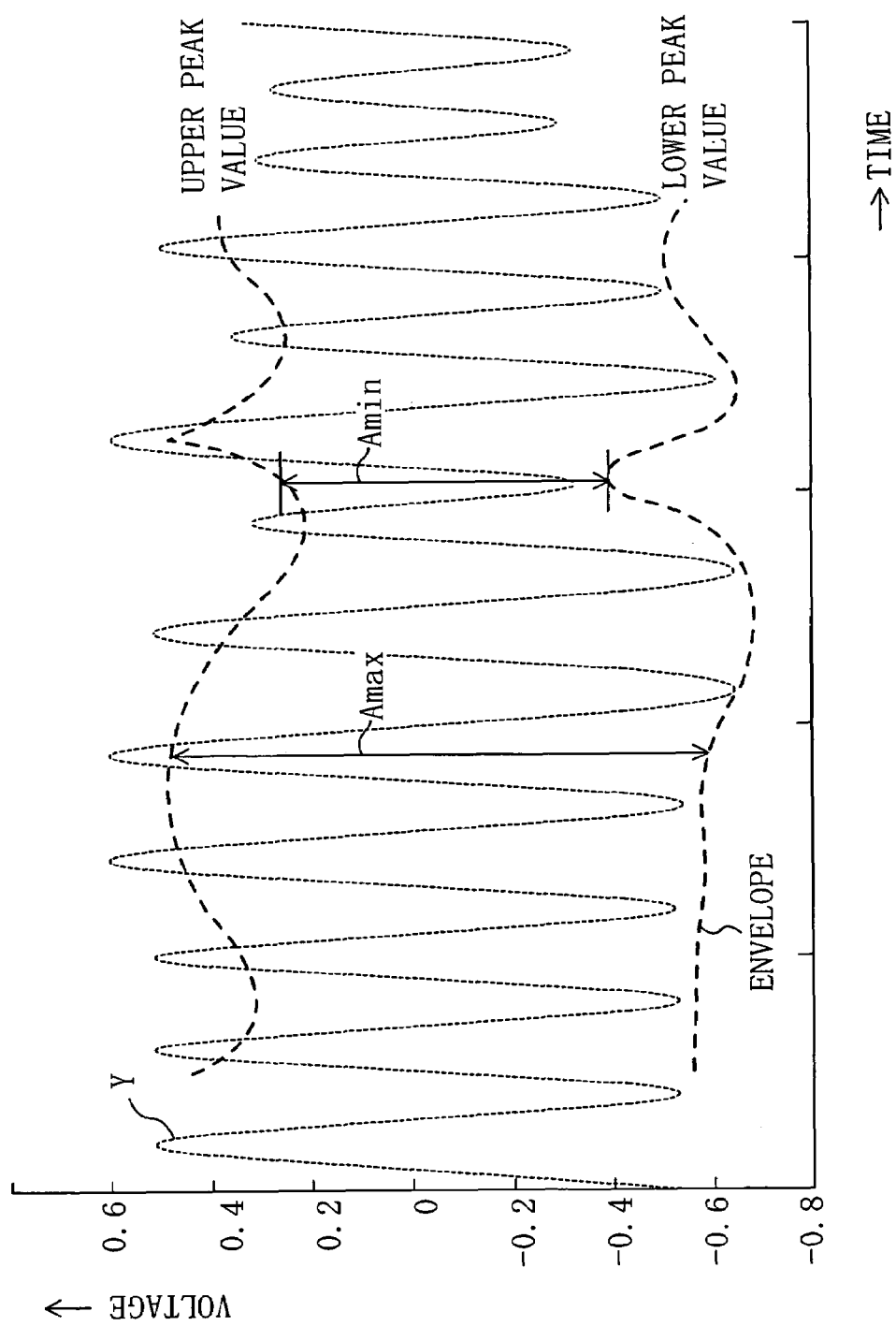
FIG. 14 is a waveform chart which illustrates detection of a feature value of a waveform equalization signal by the coefficient learning section of FIG. 12.

FIG. 14 illustrates detection of a feature value in the waveform equalization signal Y, which is performed by the coefficient leaning section 132 of FIG. 12. Information obtained from the envelope of the waveform equalization signal Y includes, for example, the upper peak value and lower peak value. From these information, the maximum amplitude value Amax and the minimum amplitude value Amin of the waveform equalization signal Y are obtained.

Thus, the coefficient section 115 of FIG. 3 has the function of adaptively updating the tap coefficients A, B and C, which are to be supplied to the three multipliers 112, according to the maximum amplitude value Amax and the minimum amplitude value Amin which are detected from the envelope of the waveform equalization signal Y within a predetermined time period. With such a function, gain adjustment of the waveform equalization signal Y is achieved. Alternatively, adaptive waveform equalization may be achieved by using information derived from a coding method as a feature value of the waveform equalization signal Y.

Figure 15:
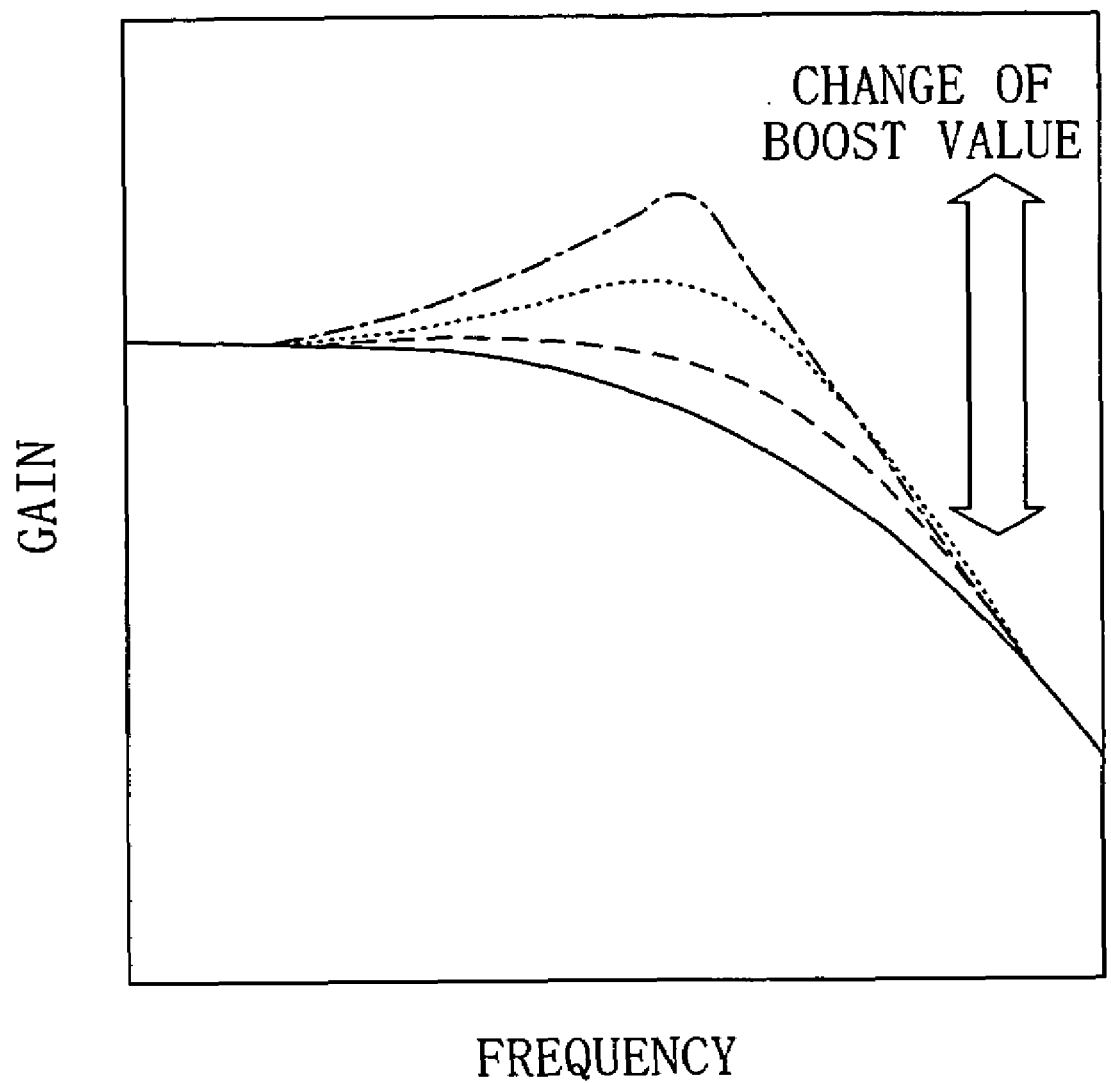
FIG. 15 illustrates an example where the gain characteristic of the waveform equalizer of FIG. 3 is changed in a stepwise fashion according to an evaluation signal.

FIG. 15 shows an example where the gain characteristic of the waveform equalizer 103 of FIG. 3 is changed in a stepwise fashion according to the evaluation signal E. In an example illustrated in FIG. 15, the boost value of the waveform equalizer 103 is changed in a stepwise fashion. The change of the boost value can be achieved only by changing the tap coefficients A, B and C of the waveform equalizer 103. The determination circuit 171 of FIG. 13 updates the boost value while storing the relationship between the boost value and the evaluation signal E, and then selects the boost value such that an optimum state is recreated.

Figure 16A:
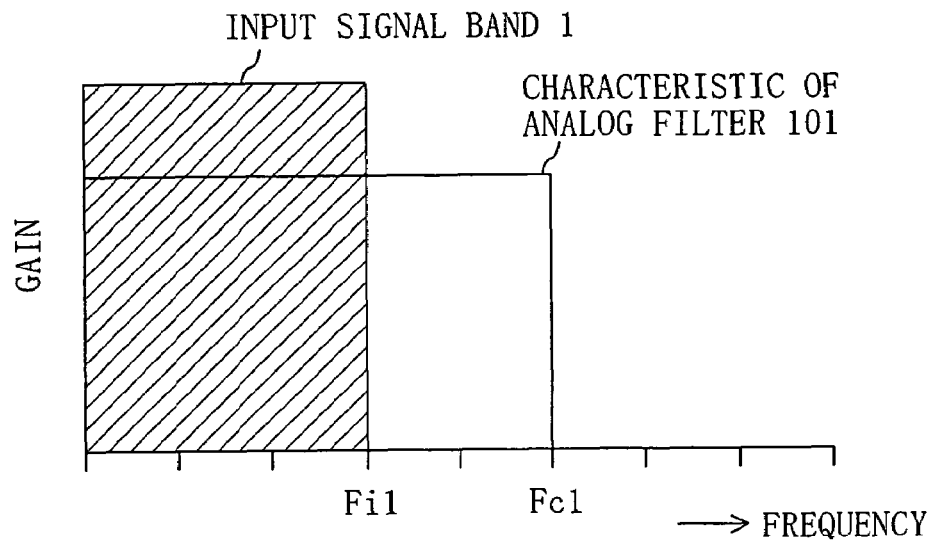
FIGS. 16A and 16B illustrate examples where the characteristic of the analog filter of FIG. 1 is changed.
Figure 16B:
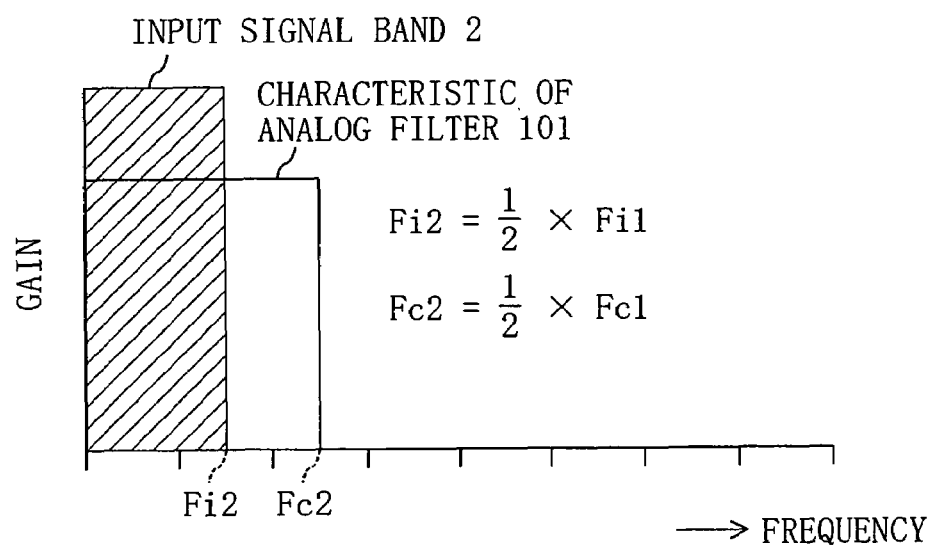

The characteristic of the analog filter 101 of FIG. 1 also can be changed according to the bit rate of the input reproduction signal IN. FIGS. 16A and 16B show examples where the characteristic of the analog filter 101 is changed. Reference marks Fi1 and Fi2 each denote an input signal band. Reference marks Fc1 and Fc2 each denote the cutoff frequency of the analog filter 101. In FIG. 16A, the cutoff frequency Fc1 is set to a level slightly higher than the input signal band Fi1 in consideration of the group delay characteristic of the analog filter 101. FIG. 16B shows an example where the bit rate of the input reproduction signal IN is halved, and accordingly, the input signal band is halved from Fi1 to Fi2. When the input signal band is halved in this way, the cutoff frequency of the analog filter 101 is decreased from Fc1 to Fc2 in the same proportion. However, change of the characteristic of the analog filter 101 is greatly restricted, and accordingly, it is sometimes necessary to change both the characteristics of the analog filter 101 and the waveform equalizer 103. Thus, it is preferable to perform control such that the quantized noise power of the ADC 102 is kept constant when the cutoff frequency of at least one of the analog filter 101 and the waveform equalizer 103 is changed.

As described hereinabove, a reproduction signal processing apparatus of the present invention realizes a waveform equalization characteristic optimum for the characteristic of an input reproduction signal and is therefore useful for waveform equalization of signals reproduced from various recording mediums.

What is claimed is:

1. A reproduction signal processing apparatus which equalizes a waveform of an input reproduction signal reproduced from a recording medium and outputs a binary signal based on the equalized waveform, the apparatus comprising:

an analog filter for receiving an input reproduction signal;

an analog-digital converter for converting an output of the analog filter to a digital reproduction signal;

a clock generation section for generating a clock signal for determining the sampling frequency of the analog-digital converter;

a waveform equalizer for equalizing a waveform of the digital reproduction signal; and means for performing control such that the sampling frequency of the analog-digital converter is determined and the number of taps of the waveform equalizer is changed, according to the relationship between a bit rate of the input reproduction signal and a characteristic of the analog filter, so that the quantized noise power per unit frequency which is included in a waveform equalization signal output from the waveform equalizer is constant.

2. The reproduction signal processing apparatus of claim 1, further comprising means for performing control such that the ratio of a higher one of the cutoff frequency of the analog filter and the cutoff frequency of the waveform equalizer to the sampling frequency is constant.

3. The reproduction signal processing apparatus of claim 1, further comprising means for performing control such that the quantized noise power of the analog digital converter is constant when at least one of the cutoff frequencies of the analog filter and the waveform equalizer is changed.

4. The reproduction signal processing apparatus of claim 1, further comprising means for changing tap coefficients of the waveform equalizer according to the frequency characteristic of the input reproduction signal.

5. The reproduction signal processing apparatus of claim 1, wherein the waveform equalizer includes:

a delay element including a plurality of stages for delaying propagation of the digital reproduction signal;

a plurality of multipliers for multiplying outputs of the plurality of stages of the delay element by tap coefficients;

a coefficient section for supplying the tap coefficients to the plurality of multipliers; and an adder for calculating a sum of outputs of the plurality of multipliers.

6. The reproduction signal processing apparatus of claim 5, further comprising a control section for controlling the number of stages used in the delay element, which determines the number of taps of the waveform equalizer, and supply of the tap coefficients from the coefficient section such that the plurality of multipliers and the adder are used in a time division manner when the number of multipliers is smaller than the number of necessary taps.

7. The reproduction signal processing apparatus of claim 5, further comprising a waveform evaluation section for supplying to the waveform equalizer a signal which evaluates a waveform equalization signal output from the waveform equalizer such that the tap coefficients to be supplied to the plurality of multipliers are adaptively updated.

8. The reproduction signal processing apparatus of claim 5, wherein the coefficient section has the function of adaptively updating the tap coefficients to be supplied to the plurality of multipliers according to a maximum amplitude value and a minimum amplitude value which are detected within a predetermined time period from an envelope of a waveform equalization signal output from the waveform equalizer.

* * * * *